US012784227B2

(12) United States Patent
Lee et al.

(10) Patent No.: US 12,784,227 B2
(45) Date of Patent: Nov. 3, 2026

(54) METHOD AND APPARATUS FOR ANALYZING IRON SCRAPS THROUGH IMAGE SEGMENTATION

(71) Applicants: LG CNS CO., LTD., Seoul (KR); DaehanSteel, Busan (KR)

(72) Inventors: Hee Jae Lee, Seoul (KR); Sang Jeong Lee, Seoul (KR); Tae Byeong Park, Seoul (KR); Won Young Lee, Seoul (KR); Min Je Jwa, Seoul (KR); Sung Yun Nam, Busan (KR)

(73) Assignees: LG CNS CO., LTD., Seoul (KR); DaehanSteel, Busan (KR)

( * ) Notice: Subject to any disclaimer, the term of this patent is extended or adjusted under 35 U.S.C. 154(b) by 159 days.

(21) Appl. No.: 18/991,107

(22) Filed: Dec. 20, 2024

(65) Prior Publication Data

US 2025/0209635 A1 Jun. 26, 2025

(30) Foreign Application Priority Data

Dec. 21, 2023 (KR) ........................ 10-2023-0188833

(51) Int. Cl.
*G06T 7/00* (2017.01)
*G06T 7/11* (2017.01)
(Continued)

(52) U.S. Cl.
CPC .............. *G06T 7/12* (2017.01); *G06T 7/0002* (2013.01); *G06T 7/11* (2017.01); *G06T 7/174* (2017.01);
(Continued)

(58) Field of Classification Search
CPC . G06T 7/12; G06T 7/0002; G06T 7/11; G06T 7/174; G06T 7/60; G06T 7/0004;
(Continued)

(56) References Cited

U.S. PATENT DOCUMENTS

2023/0136485 A1* 5/2023 Takami .................... C09G 1/02
252/79.1

FOREIGN PATENT DOCUMENTS

KR 10-2011-0078566 A 7/2011
KR 10-1981031 B1 5/2019
KR 10-1972819 B1 8/2019

OTHER PUBLICATIONS

Tu, Qifan, Dawei Li, Qian Xie, Li Dai, and Jun Wang. "Automated scrap steel grading via a hierarchical learning-based framework." IEEE Transactions on Instrumentation and Measurement 71 (2022): 1-13. (Year: 2022).*

(Continued)

*Primary Examiner* — Carol W Chan

(57) ABSTRACT

A method and apparatus for analyzing iron scraps through image segmentation is provided. The method includes receiving, by a receiving circuit, a loaded state image from a camera when iron scraps are loaded onto a loading device, and, by a processor, determining a target region including the iron scraps in the loaded state image, simplifying the target region, converting the simplified target region into a rectangular region, determining first and second lengths representing lengths of two different sides of the rectangular region, the second length greater than the first length, determining a number of segmentations of the target region based on a quotient obtained by dividing the second length by the first length, segmenting the loaded state image based on the number of segmentations to generate a plurality of segmented images, and performing image analysis on the plurality of segmented images to provide analysis results of the iron scraps.

18 Claims, 8 Drawing Sheets

(51) Int. Cl.
*G06T 7/12* (2017.01)
*G06T 7/174* (2017.01)
*G06T 7/60* (2017.01)

(52) U.S. Cl.
CPC ...... *G06T 7/60* (2013.01); *G06T 2207/20021* (2013.01); *G06T 2207/20212* (2013.01); *G06T 2207/30136* (2013.01)

(58) Field of Classification Search
CPC . G06T 7/136; G06T 7/62; G06T 2207/20021; G06T 2207/20212; G06T 2207/30136; G06T 2207/20132; G06T 2207/30164; G06T 5/50
See application file for complete search history.

(56) References Cited

OTHER PUBLICATIONS

Xu, Wenguang, Pengcheng Xiao, Liguang Zhu, Yan Zhang, Jinbao Chang, Rong Zhu, and Yunfeng Xu. "Classification and rating of steel scrap using deep learning." Engineering applications of artificial intelligence 123 (2023): 106241. (Year: 2023).*

* cited by examiner

METHOD AND APPARATUS FOR ANALYZING IRON SCRAPS THROUGH IMAGE SEGMENTATION

CROSS-REFERENCE TO RELATED APPLICATION

This application claims priority to and the benefit of Korean Patent Application No. 10-2023-0188833, filed on Dec. 21, 2023, the disclosure of which is incorporated herein by reference in its entirety.

BACKGROUND

1. Field of the Invention

The technical field of the present disclosure relates to a method of providing a result of image analysis for objects loaded onto a loading device, and more particularly, to a method of dividing an entire region including loaded objects into a plurality of segmented regions and providing a result of image analysis of the plurality of segmented regions.

2. Background

Recently, with the growth of the logistics industry, loading devices are being widely used to load various objects or move objects from one place to another place. Typically, the placement of objects loaded onto a loading device is determined by workers based on product type or specifications. However, manually verifying the positions of the objects can be challenging and inefficient. To address this, a segmentation method is often employed, where an entire region of the loading device onto which the objects are loaded is divided into a plurality of regions, and images of the regions are monitored.

Despite this approach, limitations persist. When the entire image is analyzed as a single region, the accuracy of the analysis may decrease, or the time required for processing may increase. Conversely, dividing the entire image into multiple regions introduces issues such as boundary overlap, where an object located at the edge of a region may be included in multiple regions, or a single object may be improperly divided during analysis.

Therefore, to overcome these challenges, there is a need for an improved image analysis method and system that minimizes analysis errors and delivers more accurate results.

SUMMARY OF THE INVENTION

The present disclosure is directed to providing a service for determining a method of segmenting a loaded state image and providing analysis results for the segmented images so that the accuracy of analysis results for a plurality of regions included in the loaded state image can be enhanced.

The objectives of the present disclosure are not limited to the above-described purpose, and additional technical objectives may also be addressed.

According to an aspect of the present disclosure, there is provided a method of analyzing iron scraps through image segmentation, which includes obtaining, by a receiving unit, a loaded state image captured in a state in which iron scraps are loaded onto a loading device, determining, by a processor, a target region including the iron scraps in the loaded state image, simplifying, by the processor, the target region and converting the simplified target region into a region shape, determining, by the processor, a first length and a second length greater than the first length representing lengths of two different sides of the converted rectangular region, determining, by the processor, the number of segmentations of the target region on the basis of a quotient obtained by dividing the second length by the first length, segmenting, by the processor, the loaded state image on the basis of the number of segmentations and obtaining a plurality of segmented images, and providing, by the processor, a result of analysis of the iron scraps loaded onto the loading device through image analysis of the plurality of segmented images.

The determining of the number of segmentations may include determining, by the processor, the number of segmentations to be a value that is 1 less than two times N when a value of the quotient is N.

The obtaining of the plurality of segmented images may include obtaining, by the processor, N segmented images, of which a horizontal length and vertical length are the first length and which do not overlap each other and obtaining, by the processor, N−1 segmented images that include boundary lines of the N segmented images and do not overlap each other.

Each of the N−1 segmented images may overlap one or two of the N segmented images.

Among boundary lines of any end segmented image of the N segmented images, a boundary line of a side at which an adjacent segmented image is present may be included in the N−1 segmented images, and a boundary line of a side at which the adjacent segmented image is not present may not be included in the N−1 segmented images.

The method may further include determining, by the processor, an interval between the plurality of segmented images on the basis of a remainder obtained by dividing the second length by the first length.

An interval between the N segmented images may be determined based on a value obtained by dividing the remainder by N−1.

The obtaining of the plurality of segmented images by the processor may include obtaining, by the processor, one or more remaining segmented images obtained by dividing the remainder by N−1, updating, by the processor, a region of each of the remaining segmented images as a region between the N−1 segmented images representing the interval between the N segmented images, and obtaining, by the processor, N−1 segmented images that include center lines of the remaining segmented images and do not overlap each other.

The obtaining of the plurality of segmented images may include determining, by the processor, one or more intervals between the N segmented images to be two times a third length, when the first length is greater than two times the third length representing a horizontal length of one or more remaining segmented images obtained by dividing the remainder by N−1, obtaining, by the processor, one or more remaining combined images by combining two consecutive images from a left end segmented image to a right end segmented image of the one or more remaining segmented images, updating, by the processor, a region of each of the remaining combined images and a region of each of the remaining segmented images to some regions among the regions of the N−1 segmented images that represent the interval between the N segmented images, and obtaining, by the processor, less than N−1 segmented images that include center lines of the remaining combined images or center lines of the remaining segmented images and do not overlap each other, and the interval between the segmented images corresponding to regions excluded from the some regions among the regions between the N−1 segmented image may be updated to have a value corresponding to 0.

The obtaining of the remaining combined images may include obtaining, by the processor, one or more remaining combined images by combining two consecutive images from the right end segmented image to the left end segmented image of the one or more remaining segmented images.

According to another aspect of the present disclosure, there is provided an apparatus for analyzing iron scraps through image segmentation, which includes a receiving unit configured to obtain a loaded state image captured in a state in which iron scraps are loaded onto a loading device, and a processor that is configured to determine a target region including the iron scraps in the loaded state image, simplify the target region and convert the simplified target region into a rectangular region, determine a first length and a second length greater than the first length representing lengths of two different sides of the converted rectangular region, determine the number of segmentations of the target region on the basis of a quotient obtained by dividing the second length by the first length, segment the loaded state image on the basis of the number of segmentations and obtaining a plurality of segmented images, and provide a result of analysis of the iron scraps loaded onto the loading device through image analysis of the plurality of segmented images.

The processor may determine the number of segmentations to be a value that is 1 less than two times N when a value of the quotient is N.

The processor may obtain N segmented images of which a horizontal length and vertical length are the first length and which do not overlap each other, and obtain N−1 segmented images that include boundary lines of the N segmented images and do not overlap each other.

Each of the N−1 segmented images may overlap one or two of the N segmented images.

According to still another aspect of the present disclosure, there is provided a computer-readable non-transitory recording medium on which a program for implementing the method of the first aspect is recorded.

BRIEF DESCRIPTION OF THE DRAWINGS

The above and other aspects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
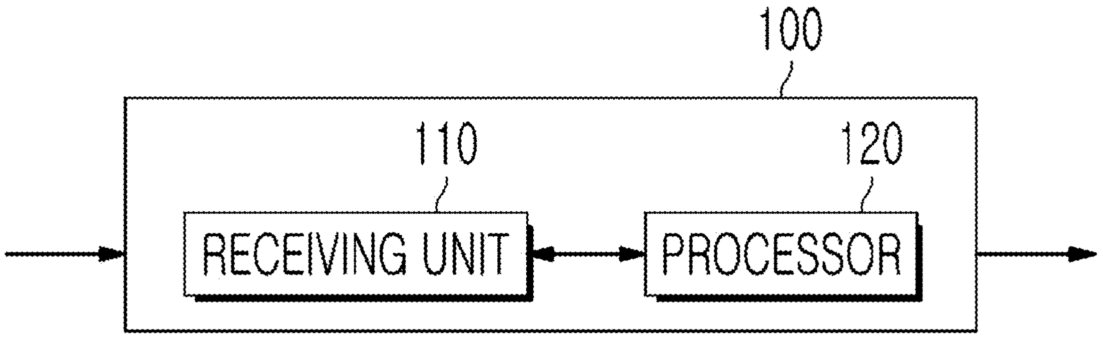
FIG. 1 is a block diagram schematically illustrating an apparatus for analyzing objects through image segmentation according to an embodiment of the present disclosure.

A detailed description of embodiments is provided below along with accompanying figures. The scope of this disclosure is limited by the claims and encompasses numerous alternatives, modifications and equivalents. Although steps of various processes are presented in a given order, embodiments are not necessarily limited to being performed in the listed order. In some embodiments, certain operations may be performed simultaneously, in an order other than the described order, or not performed at all.

Terms used herein are provided only to describe the embodiments of the present disclosure and not for purposes of limitation. In this specification, the singular forms include the plural forms unless the context clearly indicates otherwise. It will be understood that terms "comprise" and/or "comprising" used herein specify some stated components, but do not preclude the presence or addition of one or more other components. Like reference numerals throughout the specification denote like components, and "and/or" includes each and every combination of one or more of the above-describe components. It should be understood that, although the terms "first," "second," etc., may be used herein to describe various components, these components are not limited by these terms. The terms are only used to distinguish one component from another component. Therefore, it should be understood that a first component to be described below may be a second component within the technical scope of the present disclosure.

Unless otherwise defined, all terms including technical and scientific terms used herein have the same meaning as commonly understood by those skilled in the art. Further, it should be further understood that terms, such as those defined in commonly used dictionaries, should not be interpreted in an idealized or overly formal sense unless expressly so defined herein.

Spatially relative terms "below," "beneath," "lower," "above," "upper," etc., may be used to facilitate the description of a relationship between one component and other components as illustrated in the accompanying drawings. The spatially relative terms should be understood to include different directions of the element during use or operation in addition to the direction illustrated in the accompanying drawings. For example, when a component illustrated in the drawing are flipped, a component described as "below" or "beneath" another component may end up being placed "above" the other component. Therefore, an exemplary term "below" may include both downward and upward directions. Components may be arranged in different directions so that spatially relative terms may be interpreted according to the arrangement.

Hereinafter, embodiments will be described in detail with reference to the accompanying drawings.

FIG. 1 is a block diagram schematically illustrating an apparatus 100 for analyzing objects through image segmentation according to an embodiment of the present disclosure. In an embodiment, the objects may include iron scraps. For example, the following description will provide iron scraps as the objects to be analyzed.

Referring to FIG. 1, the apparatus 100 may include a receiving circuit (or unit) 110 and a processor 120.

The receiving circuit 110 may obtain a loaded state image captured when iron scraps are loaded onto a loading device. In an embodiment, the receiving circuit 110 may receive the loaded state image in the form of electrical signals such as analog or digital signals.

The processor 120 may determine a target region within the loaded state image that includes iron scraps. Further, the processor 120 may simplify the target region and convert the simplified target region into a rectangular region. Further, the processor 120 may determine a first length and a second length representing lengths of two different sides of the converted rectangular region. The second length is greater than the first length.

Further, the processor 120 may determine the number of segmentations for the target region on the basis of a quotient derived from dividing the second length by the first length. Further, the processor 120 may segment the loaded state image on the basis of the number of segmentations, generating a plurality of segmented images. The processor 120 may then perform image analysis on the plurality of segmented images to provide analysis results for the iron scraps loaded onto the loading device.

Further, the apparatus 100 may be integrated with various conventional networks, such as the Internet, a mobile communication network, etc. These networks can be utilized during the process in which the receiving circuit 110 obtains the loaded state image, and the processor 120 determines the target region, determines the number of segmentations for the target region, generates the plurality of segmented images, and provides the results of image analysis on the basis of the segmented images. It should be noted that there is no special limitation regarding the types of networks that can be used.

In addition, it should be understood by those skilled in the art that other general components other than those illustrated in FIG. 1 may be further included in the apparatus 100. For example, the apparatus 100 may further include a memory (not illustrated) that stores the loaded state image, the target region, the plurality of segmented images, etc., and may further include a transmitting circuit (not illustrated) that transmits the results of image analysis or a display unit (not illustrated) that displays the results of image analysis. Alternatively, it will be understood by those skilled in the art that in another embodiment, some of the components illustrated in FIG. 1 may be omitted.

The apparatus 100 may be used by a user, may be linked with any type of handheld-based wireless communication devices equipped with a touch screen panel, such as a mobile phone, a smartphone, a personal digital assistant (PDA), a portable multimedia player (PMP), a tablet computer, etc. Additionally, the apparatus 100 may be integrated with or connected to a device capable of installing and running applications, such as a desktop personal computer (PC), a tablet computer, a laptop computer, an Internet Protocol television (IPTV) with a set-top box, or the like.

The apparatus 100 may be implemented as a terminal such as a computer or the like that operates through a computer program to realize the functions described in this specification.

The apparatus 100 may include a system (not illustrated) that provides the results of image analysis of the iron scraps and a related server (not illustrated), but the present disclosure is not limited thereto. According to an embodiment, the server may support an application that provides information on the results of image analysis of the iron scraps.

Hereinafter, an example is described in which the apparatus 100 independently obtains and provides the results of image analysis based on a preset image segmentation method. However, as described above, the apparatus 100 may also perform the above function in conjunction with the server. That is, the apparatus 100 and the server may be integrated to perform their functions, with the server potentially being omitted. It should be noted that the present disclosure is not limited to any single embodiment.

In an embodiment, the apparatus 100 and the server may be linked with each other to perform a process of segmenting an image and a process for providing analysis results, either by the server or by the apparatus 100 itself. For example, the apparatus 100 may function as a server, and in such cases, the apparatus 100 and the server will hereinafter be collectively referred to as the apparatus 100.

Figure 2:
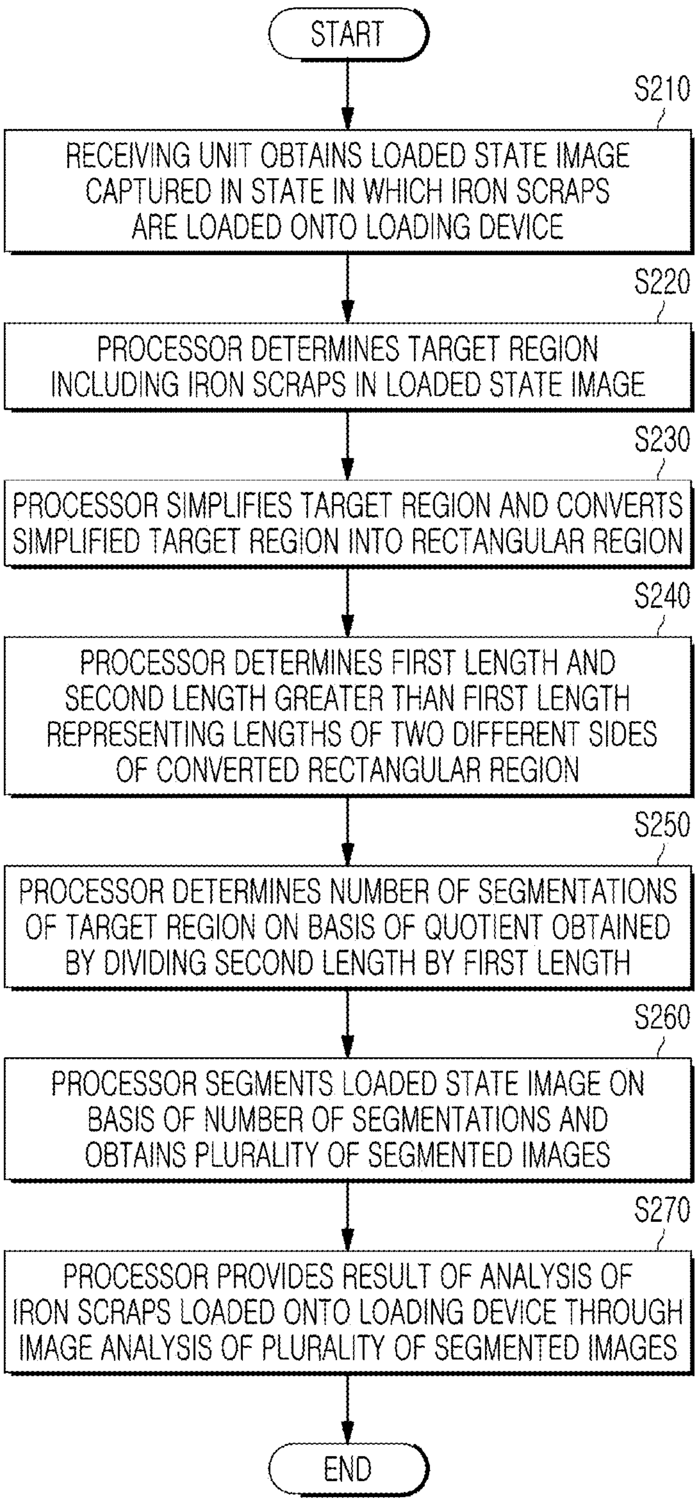
FIG. 2 is a flowchart illustrating operations in which the apparatus for analyzing the iron scraps through image segmentation according to an embodiment of the present disclosure provides results of image analysis.

FIG. 2 is a flowchart illustrating operations in which the apparatus 100 for analyzing the iron scraps through image segmentation provides the results of image analysis.

Referring to operation S210, the apparatus 100 may obtain a loaded state image captured in a state where iron scraps are loaded onto a loading device. For example, the apparatus 100 may receive, by the receiving circuit 110, the loaded state image captured by a camera (not illustrated) positioned above the loading device, looking down at it.

Referring to operation S220, the apparatus 100 may determine a target region, which includes the iron scraps, in the loaded state image. The target region may include only an area containing the iron scraps, excluding both regions outside the loading device and areas without iron scraps in the loaded state image captured by the camera. In other words, the apparatus 100 may determine the target region as the area containing the iron scraps for performing image analysis.

Referring to operation S230, the apparatus 100 may simplify the target region and convert the simplified target region into a rectangular region. Generally, the loading device may correspond to the rectangular region where a horizontal length is longer than a vertical length with respect to the orientation of the drawing. Therefore, the apparatus 100 may convert the target region to be a target of image analysis into the rectangular region.

Referring to operation S240, the apparatus 100 may determine a first length and a second length of two different sides of the rectangular region. The second length is greater than the first length. In an embodiment, the apparatus 100 may determine the vertical length of the rectangular region to be the first length and the horizontal length of the rectangular region to be the second length.

Referring to operation S250, the apparatus 100 may determine the number of segmentations of the target region on the basis of a quotient derived from dividing the second length by the first length. The apparatus 100 may set the number of segmentations to be greater than a value corresponding to the quotient. For example, the apparatus 100 may first obtain the number of segmentations based on the quotient and further obtain the number of segmentations corresponding to a value smaller than the quotient.

Referring to operation S260, the apparatus 100 may segment the loaded state image on the basis of the number of segmentations and obtain a plurality of segmented images. For example, the apparatus 100 may determine the number of segmentations to be one less than twice the value of the quotient, denoted as 2N−1, when the value of the quotient is N. This formula, derived from N+(N−1), applies when there is no remainder.

For example, if there is no remainder and the value of the quotient is N, the loaded state image may be preferentially segmented into N images based on the value of the quotient. These N segmented images each have the first length as both width and length, and they do not overlap. After obtaining the N segmented images, the apparatus 100 may generate N−1 segmented images that include boundary lines of the N segmented images, ensuring no overlap. As a result, the number of segmentations for the target region may be determined to be 2N−1 (=N+(N−1)).

On the other hand, if there is a remainder when dividing the second length by the first length, the apparatus 100 may perform an additional process to segment the remaining regions. This process will be described in more detail with reference to FIGS. 3 to 9.

Referring to operation S270, the apparatus 100 may provide results of analysis of the iron scraps loaded onto the loading device through image analysis for the plurality of segmented images. The apparatus 100 may perform the image analysis on each of the plurality of segmented images obtained in operations S210 to S260, and may provide a result of image analysis that is obtained for each of the plurality of segmented images. The apparatus 100 may provide, by the transmitting circuit (not illustrated), information on the results of image analysis to a user terminal, and may display each of the plurality of segmented images.

Figure 3:
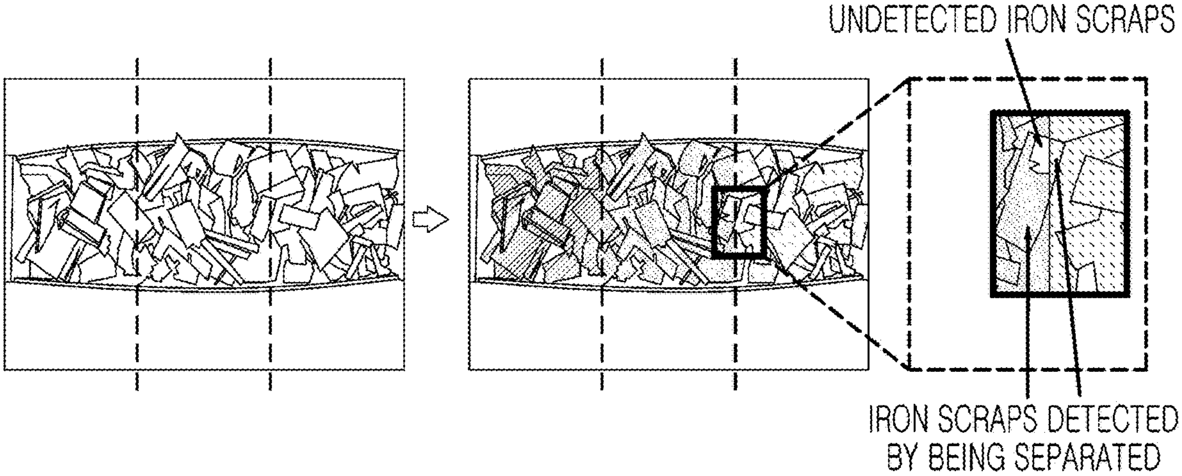
FIG. 3 is a diagram illustrating an example in which the apparatus for analyzing the iron scraps according to an embodiment of the present disclosure obtains an incorrect result of image analysis based on image segmentation.

FIG. 3 is a diagram illustrating an example in which the apparatus 100 obtains an incorrect result of image analysis based on image segmentation.

Referring to FIG. 3, the apparatus 100 may obtain one or more segmented images segmented based on one or more boundary lines. However, as shown in FIG. 3, when obtaining the one or more segmented images separated by the boundary lines, there may be limitations, such as undetected iron scraps in regions near the boundary lines or a single iron scrap being incorrectly detected as separate fragments.

Figure 4:
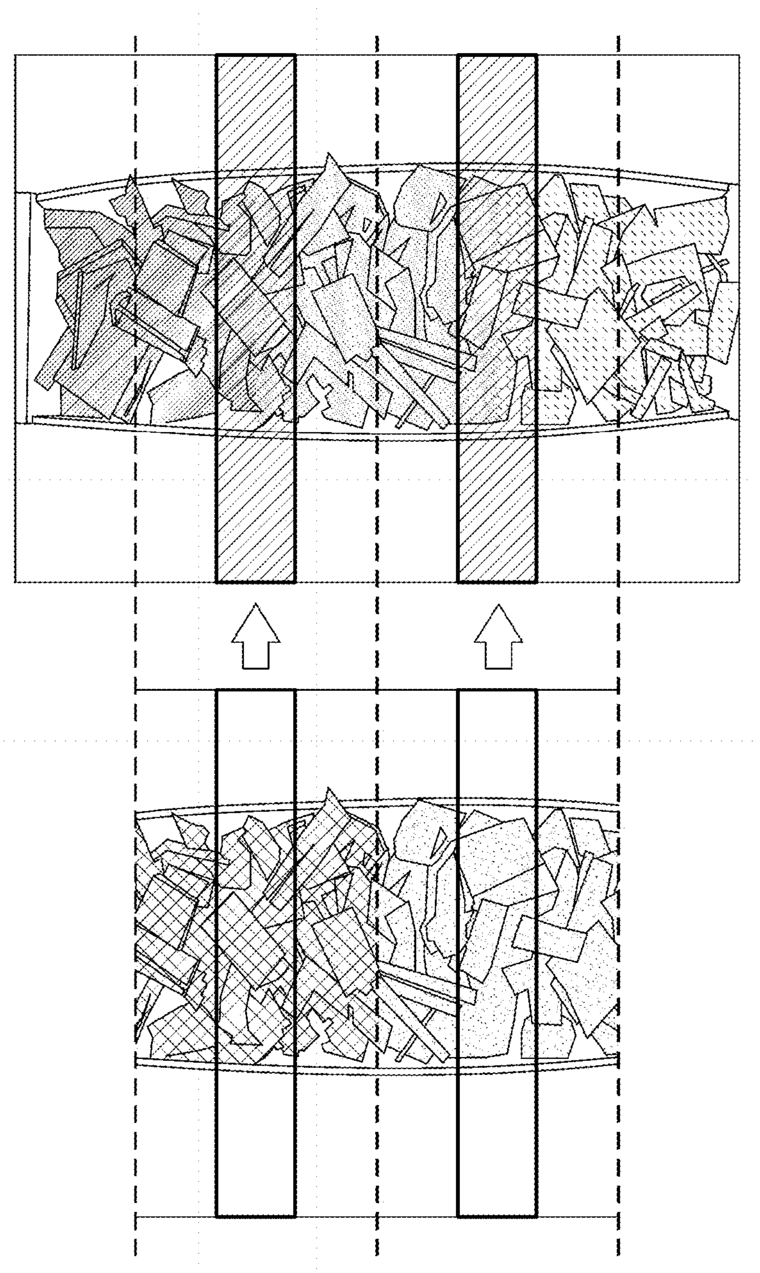
FIG. 4 is a diagram illustrating an example in which the apparatus for analyzing the iron scraps according to an embodiment of the present disclosure re-analyzes a region that produced an incorrect result in the initial image analysis.

FIG. 4 is a diagram illustrating an example in which the apparatus 100 re-analyzes a region that produced an incorrect result in the initial image analysis.

Referring to FIG. 4, to address the limitation where iron scraps may remain undetected in regions near the boundary lines or a single iron scrap may be incorrectly detected as separate fragments, the apparatus 100 may re-perform image analysis specifically on the regions near the boundary lines. For example, the apparatus 100 may further segment the image into quadrangular regions that include the regions near the boundary lines. By analyzing these segmented regions, the apparatus 100 can obtain a more accurate result of image analysis. This will be described in more detail with reference to FIG. 5.

Figure 5:
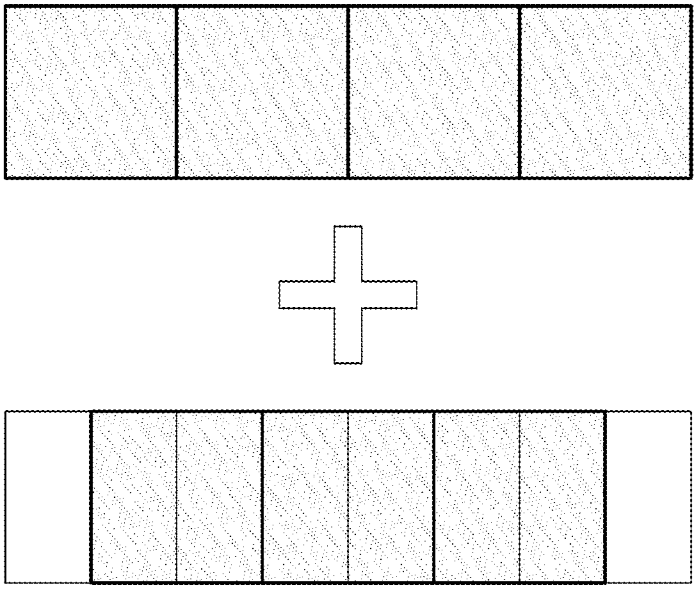
FIG. 5 is a diagram illustrating an example in which the apparatus for analyzing the iron scraps according to an embodiment of the present disclosure performs image analysis based on segmented regions, excluding the remaining area of a rectangle derived from a loaded state image.

FIG. 5 is a diagram illustrating an example in which the apparatus 100 performs image analysis based on segmented regions, excluding the remaining region of a rectangle derived from the loaded state image.

Referring to FIG. 5, when there is no remainder after dividing the second length by the first length, the apparatus 100 may obtain N segmented images where both horizontal and vertical lengths correspond to the first length (e.g., in FIG. 5, N=4). Additionally, it may obtain N−1 segmented images that include boundary lines of the N segmented images (e.g., in FIG. 5, N−1=3).

As shown in an upper part of FIG. 5, the N segmented images do not overlap, whereas in a lower part of FIG. 5, the N−1 segmented images each partially overlap one or two of the N segmented images. Specifically, the N−1 segmented images may include regions on both sides of the boundary lines. For an end segmented image (e.g., leftmost or rightmost), only boundary lines adjacent to other segmented images are included in the N−1 segmented image, while boundary lines without adjacent segmented images are excluded.

In an embodiment, the N−1 segmented images may generally correspond to square images where both the horizontal and vertical lengths equal the first length. However, in certain cases, the segmented images may be rectangular, with a horizontal length shorter than the first length.

For example, in another embodiment, the apparatus 100 may identify the position of one iron scrap located at the outermost side in both directions relative to the boundary line. This includes positions of one or more undetected iron scraps near one or more boundary lines and the positions of one or more iron scraps spanning across the boundary lines. The apparatus 100 may calculate the distance between an end point of the outermost iron scrap and the boundary line, then determine the horizontal length of the segmented image as twice this distance. As a result, the apparatus 100 obtains a rectangular segmented image with different horizontal and vertical lengths focusing only on the relevant regions and excluding unnecessary areas.

Figure 6:
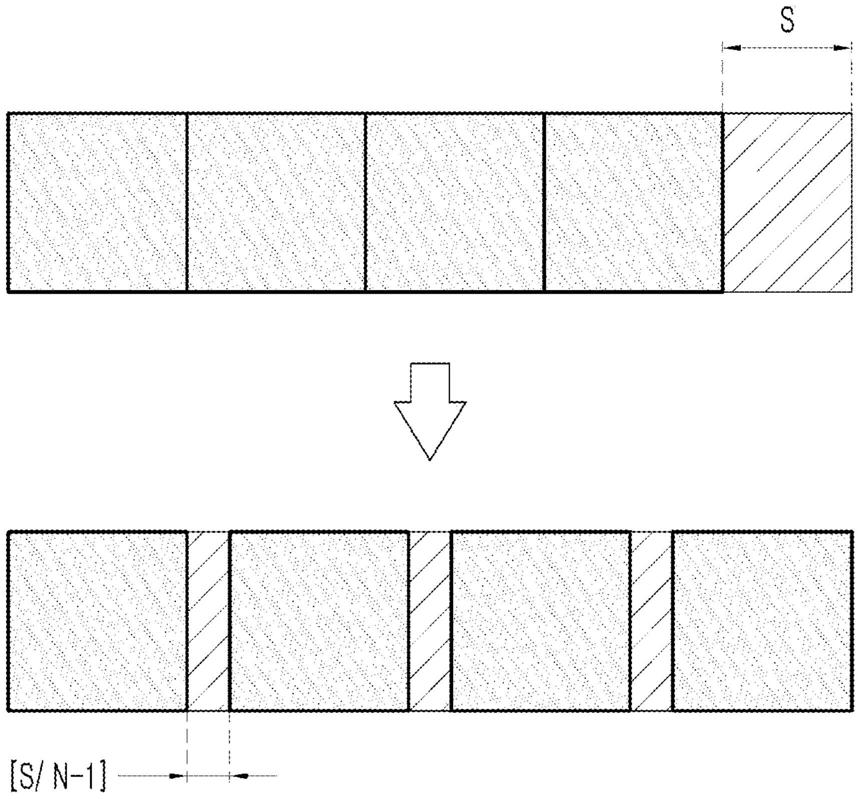
FIG. 6 is a diagram illustrating an example in which the apparatus for analyzing the iron scraps according to an embodiment of the present disclosure determines intervals between N−1 segmented images on the basis of the remainder.

FIG. 6 is a diagram illustrating an example in which the apparatus 100 determines intervals between N segmented images on the basis of the remainder.

Referring to FIG. 6, the apparatus 100 may determine intervals between a plurality of segmented images on the basis of a remainder obtained by dividing a second length by a first length. In an embodiment, the intervals between the plurality of segmented images may correspond to intervals between the N segmented images. In an embodiment, the intervals between the N segmented images may be determined based on a value obtained by dividing the remainder by N−1. For example, the remainder may represent a region where the horizontal length is shorter than the first length.

As shown in FIG. 6, when the N segmented images are obtained based on the quotient obtained by dividing the second length by the first length, the intervals between the N segmented images may be determined based on a horizontal length S of the remainder. The apparatus 100 may update the position of the image corresponding to the remainder by dividing the horizontal length S by N−1, thereby establishing the intervals between the N segmented images.

For example, the apparatus 100 may generate one or more remaining segmented images by dividing the remainder horizontally by N−1. That is, the apparatus 100 may obtain the N−1 remaining segmented images by dividing the horizontal length S corresponding to the remainder by N−1. The apparatus 100 may update the positions of the N−1 remaining segmented images to align with the intervals between the N segmented images. As shown in FIG. 6, the apparatus 100 may update the position of each of the N−1 remaining segmented images to be located in the space between two adjacent ones of the N segmented images.

Figure 7:
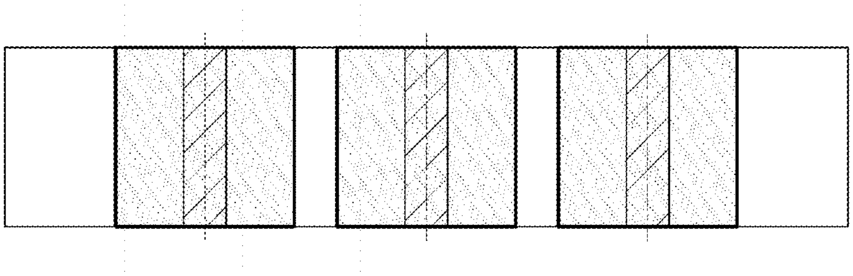
FIG. 7 is a diagram illustrating an example in which the apparatus for analyzing the iron scraps according to an embodiment of the present disclosure performs image analysis based on image segmentation when there is a remaining rectangular region obtained based on the loaded state image.

FIG. 7 is a diagram illustrating an example in which the apparatus 100 performs image analysis based on image segmentation when there is a remaining rectangular region obtained based on the loaded state image.

Referring to FIG. 7, the apparatus 100 may update the positions of the N−1 remaining segmented images and then additionally obtain N−1 segmented images that include center lines of the N−1 remaining segmented images without any overlap. Specifically, the apparatus 100 may perform image analysis on the image corresponding to the remainder by obtaining the N−1 segmented images, which correspond to squares with horizontal and vertical lengths equal to the first length, using the N−1 remaining segmented image as the center lines, The apparatus 100 may then provide a result of analysis of the image corresponding to the remainder.

In an embodiment, the apparatus 100 may adjust the intervals between the N segmented images. This adjustment is necessary because even when the horizontal length of the remainder is divided by N−1 to obtain the N−1 remaining segmented images, there may still be undetected iron scraps and a single iron scrap as separate fragments in regions near the divided boundary lines. This adjustment will be described with reference to FIGS. 8 and 9.

Figure 8:
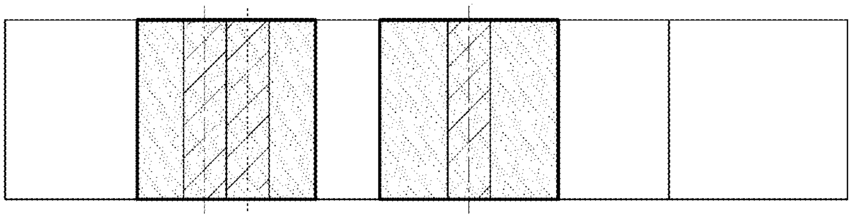
FIG. 8 is a diagram illustrating an example in which the apparatus for analyzing the iron scraps according to an embodiment of the present disclosure performs image analysis by adjusting an interval between segmented images according to a first method.

FIG. 8 is a diagram illustrating an example in which the apparatus 100 performs image analysis by adjusting an interval between segmented images according to a first method.

Referring to FIG. 8, the apparatus 100 may determine one or more intervals between the N segmented images to be twice a third length when the first length is greater than twice the third length, where the third length represents a horizontal length of each of one or more remaining segmented images obtained by dividing the remainder by N−1. Further, the apparatus 100 may obtain one or more remaining combined images by combining two consecutive images, from the left end segmented image to the right end segmented image, of the one or more remaining segmented images according to the first method.

As shown in FIG. 8, when the first length is greater than twice the third length, the apparatus 100 may obtain two consecutive images from the left as the remaining combined image from among the N−1 remaining segmented images obtained by dividing S, which represents the horizontal length corresponding to the remainder in FIG. 6, by N−1. The apparatus 100 may then obtain the one or more remaining combined images by combining two consecutive images, according to the number of N−1, and obtain one remaining segmented image together with two images that are not consecutive.

The apparatus 100 may update a region of each of the remaining combined images and a region of each of the remaining segmented images to specific regions among the regions between the N−1 segmented images, which represent the intervals between the N segmented images. As illustrated in FIG. 8, the apparatus 100 may update the remaining combined image, which includes two consecutive remaining segmented images, to the space between two adjacent ones of the N−1 segmented images, and update one remaining segmented image, in which two remaining segmented images are not consecutive, to a region other than the regions occupied by the remaining combined images.

Therefore, the apparatus 100 may obtain fewer than N−1 segmented images, which include the center lines of the remaining combined images or center lines of the remaining segmented images without overlap. In an embodiment, since the remaining combined images include consecutive remaining segmented images, fewer than N−1 segmented images may be obtained by selecting specific regions between the N−1 segmented images.

Further, the apparatus 100 may update the interval between the segmented images in regions excluded from the update locations to a value corresponding to 0. As a result, the apparatus 100 may determine the interval between the segmented images in these excluded regions to be 0 and obtain fewer than N−1 segmented images corresponding to the update locations of the remaining segmented images, excluding the regions in which the interval between the segmented images is 0.

In FIG. 8, the number of remaining combined images is described as being one, but the present disclosure is not limited thereto. A plurality of remaining combined images may be determined based on the number of N. By obtaining the N−1 segmented images corresponding to the update locations of the remaining segmented images, as shown in FIG. 7, and further obtaining fewer than N−1 segmented images corresponding to the update locations of the remaining combined images, as shown in FIG. 8, the apparatus 100 can achieve more accurate results in cases where undetected iron scraps or iron scrap that is separated are present in the remaining region. This process can be further applied in cases where undetected iron scraps or separated iron scraps are detected as the remainder is divided into one or more remaining segmented images and the segmented images are obtained.

Figure 9:
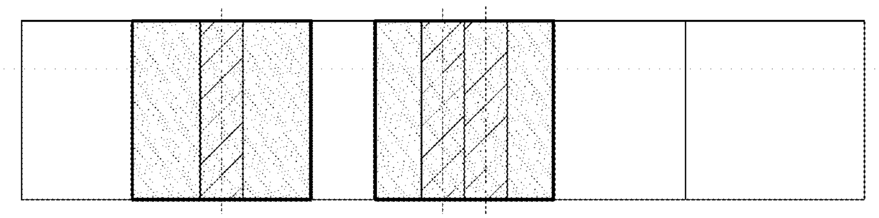
FIG. 9 is a diagram illustrating an example in which the apparatus for analyzing the iron scraps according to an embodiment of the present disclosure performs image analysis by adjusting intervals between segmented images according to a second method.

FIG. 9 is a diagram illustrating an example in which apparatus 100 performs image analysis by adjusting intervals between segmented images according to a second method.

Referring to FIG. 9, the apparatus 100 may obtain one or more remaining combined images by combining two consecutive images from the right end segmented image to the left end segmented image of one or more remaining segmented images according to the second method. In contrast to FIG. 8, where the remaining combined images are obtained by combining two consecutive images from the left of the remaining segmented image according to the first method, FIG. 9 shows the remaining combined images being obtained by combining two consecutive images from the right of the remaining segmented image according to the second method.

This approach ensures that all cases where there are undetected iron scraps or where one iron scrap is detected as separated-whether occurring on the left and right side between the plurality of remaining segmented images—can be identified. As shown in FIG. 9, it is possible to obtain fewer than N−1 segmented images, including remaining combined images combined in the opposite direction to those in FIG. 8. Additionally, the interval between the segmented images corresponding to excluded regions between the N−1 segmented images can be updated to a value corresponding to 0.

In an embodiment, the process described with reference to FIGS. 7 to 9 involves obtaining a square image that includes one or more remaining segmented images or one or more remaining combined images. However, the present disclosure is not limited thereto. As described above, the plurality of segmented images may also be obtained by determining the horizontal length to be shorter than the first length, thereby obtaining a rectangular image.

According to an embodiment, image analysis can be performed by segmenting a region of a loaded object into smaller images, rather than extracting the entire region of the loaded object from the whole image at once using a general segmentation technique, This approach allows for highly accurate image analysis results while reducing the time required for processing.

Further, when image analysis is performed through image segmentation as described in the present disclosure, it offers the advantage of providing more precise analysis for objects located near the segmentation boundary. This helps solve the problem of incorrect determination of grades/items that may arise due to segmentation errors. Furthermore, by using a certain segmentation size, the efficiency of image analysis can be enhanced, as it allows for the image analysis to continue in blank areas, even when there is a remaining region to be analyzed.

Figure 10:
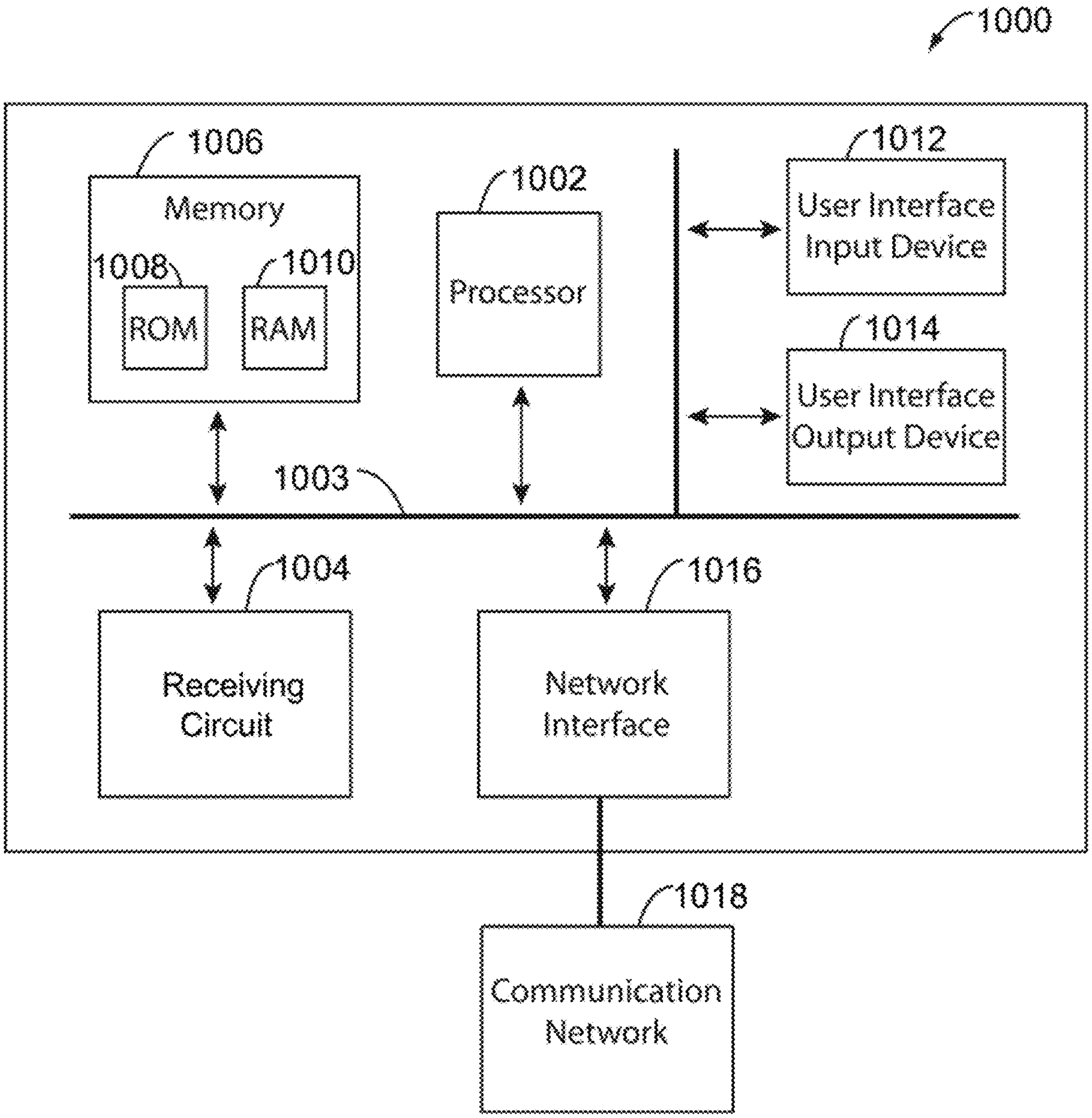
FIG. 10 shows a simplified diagram of a device that corresponds to the apparatus illustrated in FIG. 1, according to an embodiment of the present disclosure.

FIG. 10 shows a simplified diagram of a device 1000 that corresponds to the device 100 illustrated in FIG. 1, according to an embodiment of the present disclosure. The device 1000 comprises a processor 1002 and a receiving circuit 1004 that are in communication with each other via a bus 1003. The device 1000 may also include a memory 1006. The memory 1006 may include a Read Only Memory (ROM) 1008 and a Random Access Memory (RAM) 1010. The device 1000 may further include a user interface input device 1012 (e.g., a keyboard, mouse, or touch screen) and a user interface output device 1014 such as a display screen. In an implementation, the user interface input device 1012 and the user interface output device 1014 may be integrated together, e.g., a touch display screen. A network interface 1016 is configured to allow information to be communicated between the device 1000 and a loading device (not shown) via a communications network 1018.

Various embodiments of the present disclosure may be implemented as software including one or more instructions stored in a storage medium (e.g., a memory) that can be read by a machine (e.g., a display device or a computer). For example, a processor (e.g., the processor 120) of the machine may call at least one of the stored instructions from the storage medium and execute the instruction. This enables the device to operate to perform at least one function in accordance with the at least one called instruction. The one or more instructions may include code generated by a compiler or code executable by an interpreter. The storage medium readable by the device may be provided in the form of a non-transitory storage medium. Here, the term "non-transitory" means only that the storage medium is a tangible device and does not contain signals (e.g., electromagnetic waves), and this term does not distinguish between a case where data is stored semi-permanently and a case where data is stored temporarily in the storage medium.

According to an embodiment, the method according to various embodiments disclosed in the present disclosure may be included in a computer program product and provided. The computer program product may be traded between a seller and a buyer as a commodity. The computer program product may be distributed in the form of a machine-readable storage medium (e.g., a compact disc read-only memory (CD-ROM)), or may be distributed online (e.g., by download or upload) through an application store (e.g., Play Store™) or directly between two user devices (e.g., smartphones). In the case of online distribution, at least a portion of the computer program product may be temporarily stored or temporarily generated in a machine-readable storage medium, such as a memory of a manufacturer's server, an application store's server, or an intermediary server.

According to an embodiment of the present disclosure, image analysis can be performed by segmenting a region of a loaded object into smaller images, rather than extracting the entire region from a full image using a general segmentation technique. This approach enables highly accurate image analysis results while reducing the time required.

Further, when image analysis is performed through image segmentation as described in the present disclosure, it allows for highly accurate analysis of a loaded object within a segmentation boundary, effectively addressing the problem of incorrect grade/item determination caused by segmentation errors.

Further, by using a certain segmentation size, the efficiency of image analysis can be enhanced, as the image analysis can be updated in blank areas, even when there is a remaining region.

Effects of the present disclosure are not limited to the above-described effects and other effects that are not described may be clearly understood by those skilled in the art from the above detailed descriptions.

While the present disclosure has been described with reference to the accompanying drawings, it is not limited to the disclosed embodiments and drawings, and it will be understood by those skilled in the art that various changes in form and details may be made without departing from the spirit and scope of the present disclosure. Therefore, the disclosed methods should be considered from an exemplary point of view for description rather than a limiting point of view. Even when the embodiments are described and the effects according to the configuration of the present disclosure are not explicitly described, effects that may be predicted by the configuration may also be recognized. The scope of the present disclosure is defined not by the detailed description of the present disclosure but by the appended claims and encompasses all modifications and equivalents that fall within the scope of the appended claims and will be construed as being included in the present disclosure.

What is claimed is:

1. A method of analyzing iron scraps through image segmentation, the method comprising:

receiving, by a receiving circuit, a loaded state image from a camera in a state where iron scraps are loaded onto a loading device;

determining, by a processor, a target region including the iron scraps in the loaded state image;

simplifying, by the processor, the target region;

converting, by the processor, the simplified target region into a rectangular region;

determining, by the processor, a first length and a second length representing lengths of two different sides of the rectangular region, the second length being greater than the first length;

determining, by the processor, a number of segmentations of the target region based on a quotient obtained by dividing the second length by the first length;

segmenting, by the processor, the loaded state image based on the number of segmentations to generate a plurality of segmented images; and performing, by the processor, image analysis on the plurality of segmented images to provide a result of analysis of the iron scraps loaded onto the loading device.

2. The method of claim 1, wherein the determining of the number of segmentations includes determining, by the processor, the number of segmentations to be 2N−1 when a value of the quotient is N.

3. The method of claim 2, wherein the generating of the plurality of segmented images includes:

generating, by the processor, N segmented images having a first-side length and a second-side length equal to the first length, wherein the N segmented images do not overlap each other, the first-side length being perpendicular to the second-side length; and generating, by the processor, N−1 segmented images that include boundary lines of the N segmented images, wherein the N−1 segmented images do not overlap each other.

4. The method of claim 3, wherein each of the N−1 segmented images overlaps one or two of the N segmented images.

5. The method of claim 3, wherein, among boundary lines of any end segmented image of the N segmented images, a boundary line on a side where an adjacent segmented image is present is included in the N−1 segmented images, and a boundary line on a side where no adjacent segmented image is present is excluded from the N−1 segmented images.

6. The method of claim 2, further comprising determining, by the processor, intervals between the plurality of segmented images based on a remainder obtained by dividing the second length by the first length.

7. The method of claim 6, wherein the generating of the plurality of segmented images includes:

generating, by the processor, N segmented images having a first-side length and a second-side length equal to the first length, wherein the N segmented images do not overlap each other, the first-side length being perpendicular to the second-side length, wherein an interval between two adjacent ones of the N segmented images is determined based on a value obtained by dividing the remainder by N−1.

8. The method of claim 7, wherein the generating of the plurality of segmented images further includes:

generating, by the processor, one or more remaining segmented images by dividing the remainder by N−1;

updating, by the processor, a region of each of the one or more remaining segmented images as a region between two adjacent ones of the N segmented images, which represents the interval between the two adjacent ones of the N segmented images; and generating, by the processor, N−1 segmented images that include center lines of the one or more remaining segmented images, wherein the N−1 segmented images do not overlap each other.

9. The method of claim 6, wherein the generating of the plurality of segmented images includes:

generating, by the processor, N segmented images having a first-side length and a second-side length equal to the first length, wherein the N segmented images do not overlap each other, the first-side length being perpendicular to the second-side length;

determining, by the processor, each of one or more intervals between the N segmented images to be twice a third length when the first length is greater than twice the third length, wherein the third length represents a horizontal length of each of one or more remaining segmented images obtained by dividing the remainder by N−1, the horizontal length corresponding to a shorter one of lengths of two different sides of each remaining segmented image;

generating, by the processor, one or more remaining combined images by combining two consecutive images from a left end segmented image to a right end segmented image of the one or more remaining segmented images;

updating, by the processor, a region of each of the one or more remaining combined images and a region of each of the remaining segmented images to specific regions among regions of the N segmented images, which represent the intervals between the N segmented images; and generating, by the processor, fewer than N−1 segmented images that include center lines of the remaining combined images or center lines of the remaining segmented images, wherein the fewer than N−1 segmented images do not overlap each other, wherein intervals between the segmented images corresponding to regions excluded from the specific regions among the regions between the N segmented images is updated to have a value corresponding to 0.

10. The method of claim 9, wherein the generating of the one or more remaining combined images includes generating, by the processor, the one or more remaining combined images by combining two consecutive images from the right end segmented image to the left end segmented image of the one or more remaining segmented images, rather than from the left end segmented image to the right end segmented image.

11. An apparatus for analyzing iron scraps through image segmentation, the apparatus comprising:

a receiving circuit configured to receive a loaded state image from a camera in a state where iron scraps are loaded onto a loading device; and a processor configured to:

determine a target region including the iron scraps in the loaded state image;

simplify the target region;

convert the simplified target region into a rectangular region;

determine a first length and a second length representing lengths of two different sides of the rectangular region, the second length being greater than the first length;

determine a number of segmentations of the target region based on a quotient obtained by dividing the second length by the first length;

segment the loaded state image based on the number of segmentations to generate a plurality of segmented images; and perform image analysis on the plurality of segmented images to provide a result of analysis of the iron scraps loaded onto the loading device.

12. The apparatus of claim 11, wherein the processor determines the number of segmentations to be 2N−1 when a value of the quotient is N.

13. The apparatus of claim 12, wherein the processor is configured to:

generate N segmented images having a first-side length and a second-side length equal to the first length, wherein the N segmented images do not overlap each other, the first-side length being perpendicular to the second-side length; and generating N−1 segmented images that include boundary lines of the N segmented images, wherein the N−1 segmented images do not overlap each other.

14. The apparatus of claim 13, wherein each of the N−1 segmented images overlaps one or two of the N segmented images.

15. A non-transitory computer-readable recording medium on which a program is recorded, the program comprising instructions that, when executed by a processor, cause the processor to:

determine a target region including iron scraps in a loaded state image captured by a camera when iron scraps are loaded onto a loading device;

simplify the target region;

convert the simplified target region into a rectangular region;

determine a first length and a second length representing lengths of two different sides of the rectangular region, the second length being greater than the first length;

determine a number of segmentations of the target region based on a quotient obtained by dividing the second length by the first length;

segment the loaded state image based on the number of segmentations to generate a plurality of segmented images; and perform image analysis on the plurality of segmented images to provide a result of analysis of the iron scraps loaded onto the loading device.

16. The non-transitory computer-readable recording medium of claim 15, wherein the instructions causes the processor to determine the number of segmentations to be 2N−1 when a value of the quotient is N.

17. The non-transitory computer-readable recording medium of claim 16, wherein the instructions causes the processor to:

generate N segmented images having a first-side length and a second-side length equal to the first length, wherein the N segmented images do not overlap each other, the first-side length being perpendicular to the second-side length; and generate N−1 segmented images that include boundary lines of the N segmented images, wherein the N−1 segmented images do not overlap each other.

18. The non-transitory computer-readable recording medium of claim 17, wherein each of the N−1 segmented images overlaps one or two of the N segmented images.

* * * * *